United States Patent

[11] 3,612,992

| [72] | Inventor | John C. Cronin<br>Horsham, Pa. |
|---|---|---|
| [21] | Appl. No. | 862,431 |
| [22] | Filed | Sept. 30, 1969 |
| [45] | Patented | Oct. 12, 1971 |
| [73] | Assignee | Westinghouse Electric Corporation<br>Pittsburgh, Pa. |

[54] CORONA TESTING APPARATUS INCLUDING ENERGY STORAGE MEANS FOR INDICATING TIME DIFFERENCE BETWEEN CORONA SIGNALS
2 Claims, 6 Drawing Figs.

[52] U.S. Cl. .................................................. 324/52,
324/55, 324/72, 73/71.4, 340/16
[51] Int. Cl. ...................................................... G01r 31/08
[50] Field of Search ............................................. 324/52, 72,
68, 55; 340/16; 73/71.4

[56] References Cited
UNITED STATES PATENTS
| 1,526,337 | 2/1925 | Hartley | 340/16 |
|---|---|---|---|
| 2,535,255 | 12/1950 | Barnes | 340/16 |
| 3,505,597 | 4/1970 | Cronin et al. | 324/72 |

OTHER REFERENCES

E. Bukstein— Industrial Electronics Measurement And Control— September, 1961– pp. 63–68.

Primary Examiner—Michael J. Lynch
Attorneys—A. T. Stratton, F. E. Browder and Donald R. Lackey ABSTRACT: Apparatus for the detection and location of corona within the casing of fluid-filled electrical apparatus. First and second mechanical to electrical transducers are disposed to pickup corona initiated mechanical vibrations in the apparatus under test. When a corona discharge occurs, the electrical signal from the first transducer to receive the mechanical vibrations is used to initiate the charging of a capacitor. Then, the signal provided by the other transducer, in response to the same corona discharge, is used to terminate the charging of the capacitor. The magnitude of the charge or voltage across the capacitor is a direct indication of the difference between the distances separating each transducer from the source of the corona.

PATENTED OCT 12 1971

WITNESSES
Helen M. Karkas
James T. Young Jr.

INVENTOR
JOHN C. CRONIN
BY
Donald R. Lackey
ATTORNEY 3,612,992

CORONA TESTING APPARATUS INCLUDING ENERGY STORAGE MEANS FOR INDICATING TIME DIFFERENCE BETWEEN CORONA SIGNALS

BACKGROUND OF THE INVENTION

1. Field of the Invention

The invention relates in general to electrical inductive apparatus, such as transformers, and more particularly, to he detection and location of the source of corona discharges within such apparatus.

2. Description of the Prior Art

Corona testing high voltage, liquid-filled electrical inductive apparatus, such as transformers and reactors, is desirable, as it may locate weak points or faults in the insulation system which may cause partial breakdowns in the insulation, with an accompanying energy dissipation which ionizes the surrounding insulation. Corona testing thus may locate incipient faults which allow the apparatus to pass conventional tests, but which may cause complete breakdown of the insulation at some future time.

The corona test must not only indicate the presence of corona in the liquid-immersed windings, but it should provide some means for pin pointing its location. A prior art corona testing method, for detecting and locating corona, uses both electrical signal provided by the corona discharge, and a signal responsive to the mechanical vibrations produced in the liquid by pressure changes in the liquid induced by the corona discharge. The electrical signal is used to trigger the horizontal sweep of a cathode ray oscilloscope, and the mechanical vibrations are used to provide an electrical signal which is picked up by a suitably located mechanical to electrical transducer, which has its electrical output connected to the vertical deflection terminal of the oscilloscope. The time between the start of the trace and the start of the vertical deflection indicates the distance from the corona discharge to the pickup or transducer. Moving the pickup and repeating the cycle allows the approximate location of the discharge to be located by triangulation.

This prior art method id practical, as long as the electrically transmitted pulse which triggers the horizontal sweep of the oscilloscope, has sufficient energy content to provide a vertical deflection on the scope. It is the nature of corona discharges, however, to provide some electrical pulses which are of sufficient magnitude to trigger the horizontal sweep of the oscilloscope, but which have insufficient energy content to provide mechanical vibrations useful for the initiation of the vertical deflection of the scope trace. Thus, this prior art method is subject to faulty triggering.

Another prior art method, disclosed in copending application Ser. No. 690,298, filed Dec. 13, 1967, now U.S. Pat No. 3,505,597, which is assigned to the same assignee as the present application, overcomes the faulty triggering disadvantage by using a multitrace oscilloscope, with mechanical to electrical transducers disposed in vibration responsive relationship with the apparatus under test. Each of the transducers is connected to a vertical deflection terminal of the oscilloscope, and each is connected through impedance means to the trigger terminal for the horizontal sweep of the oscilloscope. Thus, the transducer located closet to the corona discharge will trigger the horizontal sweep of all of the traces, and the traces record when the vibration reaches their associated transducer. While this arrangement eliminates false triggering, it requires the use of an oscilloscope to measure time delays, as does the first mentioned method, which makes these methods impractical for field use, as oscilloscopes or power supplies are often not readily available.

Thus, it would be desirable to be able to provide corona testing apparatus which does not require the use of an oscilloscope, and which may be readily used for test work in the field, as well as at the manufacturing site.

SUMMARY OF THE INVENTION

Briefly, the present invention eliminates the use of an oscilloscope, by using energy storage means, such as a capacitor, the measure the time delay between the arrival of corona initiated mechanical vibrations at first and second spaced mechanical to electrical transducers. The transducer which first receives a signal initiates the charging of the capacitor, and the other transducer terminates the charging when it receives the vibrations from the same corona discharge. The magnitude of the charge or voltage of the capacitor indicates the difference between the distances separating the transducers from the source of the corona. Means, such as a high-impedance voltmeter may be used to measure the capacitor voltage.

BRIEF DESCRIPTION OF THE DRAWINGS

Further advantages and uses of the invention will become more apparent when considered in view of the following detailed description and drawings, in which.

DESCRIPTION OF PREFERRED EMBODIMENTS

Figure 1:
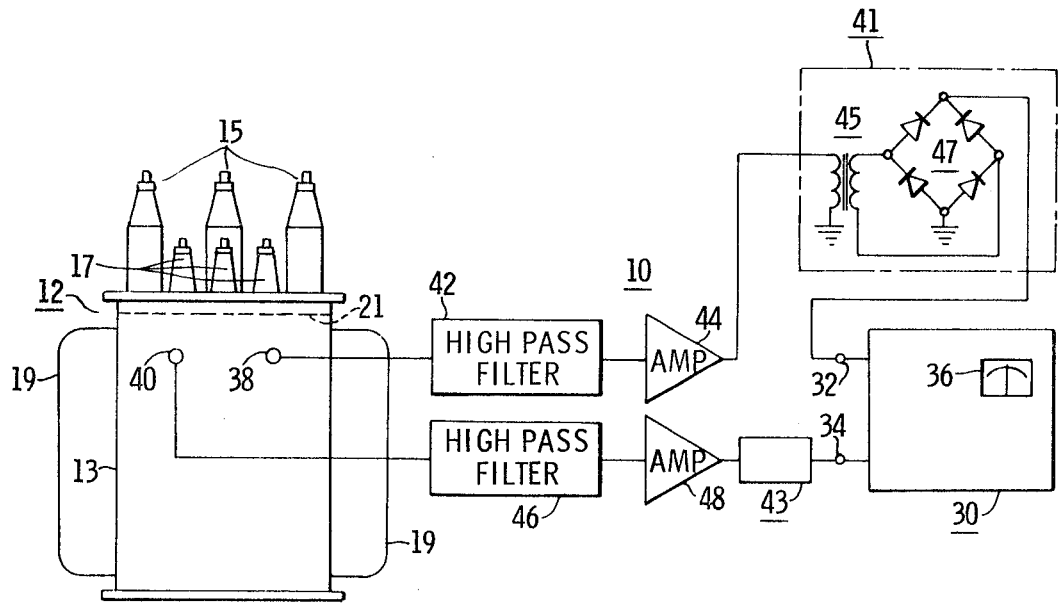
FIG. 1 is a block diagram of corona test apparatus constructed according to the teachings of the invention.

Referring now to the drawings, and FIG. 1 in particular, there is shown corona test apparatus 10 constructed according to an embodiment of the invention, for testing high-voltage inductive apparatus, such as transformer 12. Transformer 12 may be of any conventional type, having a casing 13, high- and low-voltage bushing assemblies 15 and 17, respectively, and electrical windings (not shown) disposed within the casing 13 and immersed in a fluid insulating and/or cooling dielectric, such as oil. The level of the fluid is indicted generally with a dotted line 21, and the transformer 12 may include heat exchanger means 19, if desired, for cooling the fluid.

Corona test apparatus 10 includes control means 30 having first and second input terminal means 32 and 34, respectively, and indicating means 36, such as a voltmeter, which measures the voltage on a capacitor, as will be hereinafter explained. The voltage on the capacitor is responsive to the time delay between signals applied to the input terminal means 32 and 34.

The input terminals 32 and 34 are connected to different mechanical- to electrical-type transducers, such as a microphone, with input terminal 32 being connected to a transducer 38 an input terminal 34 being connected to a transducer 40. Transducers 38 and 40 are disposed in predetermined spaced relation with one another, in mechanical vibration responsive association with transformer 12. When corona discharges are produced in the windings of transformer 12, wither when the windings are energized with their rated potential, or when the windings are surge tested, some of the discharges may dissipate sufficient energy to cause significant high-frequency pressure changes within the insulating fluid. These pressure changes cause high-frequency mechanical vibrations which may be picked up by the transducers, by either disposing them within the insulating fluid, or by placing them in contact with the casing 13 of the transformer 12.

In order to separate the portion of the electrical output signal from a transducer which is responsive to corona-induced mechanical vibrations, from that portion of the transducer output signal responsive to normal background noise in energized electrical apparatus, each electrical output signal is passed through a high pass filter. The output signal of the high pass filter may be amplified to a magnitude usable by control means 30, and the amplified signal may be rectified to extend the useful duration of the signal from the transducer for purposes of triggering a semiconductor controlled rectifier. More specifically, transducer 38 is connected to terminal 32 through high pass filter means 42, amplifier means 36, and rectifier means 41, and transducer 40 is connected to terminal 34 through high pass filter means 46, amplifier means 48, and rectifier means 43.

High pass filters 42 and 46 may be of conventional construction, utilizing inductors and capacitors connected nd arranged to pass signals having a frequency above about 25,000 Hz. Thus, the background noise will be removed from the signal without affecting the corona responsive portion. Amplifiers 44 and 48 may also be of conventional construction. Rectifiers means 41 and 43 may include a transformer and a single-phase, full-wave bridge rectifier, such as transformer 45 and bridge rectifier 47 shown relative to rectifier means 41.

When a corona discharge in transformer 12 has sufficient energy content to enable the mechanical to electrical transducers 38 and 40 to detect the resulting high-frequency vibrations and provide a responsive electrical signal, the vibrations from a given corona discharge will reach transducers 38 and 40 at slightly different times, and thus there will be a time delay between the electrical signals produced, unless the transducers are each exactly the same distance from the source of the vibrations. The magnitude of any time delay between the electrical signals provided by transducers 38 and 40 is directly responsive to the difference between the distance between transducer 38 and the corona source, and the distance between transducer 40 and the corona source. This time delay is measured, according to the teachings of this invention, by initiating the charging of the capacitor with the first signal provided by one of the transducers, and terminating the charging of the capacitor with the signal from the other transducer. The magnitude of the voltage is measured by indicating means 36, which may be a high-impedance voltmeter.

Figure 2:
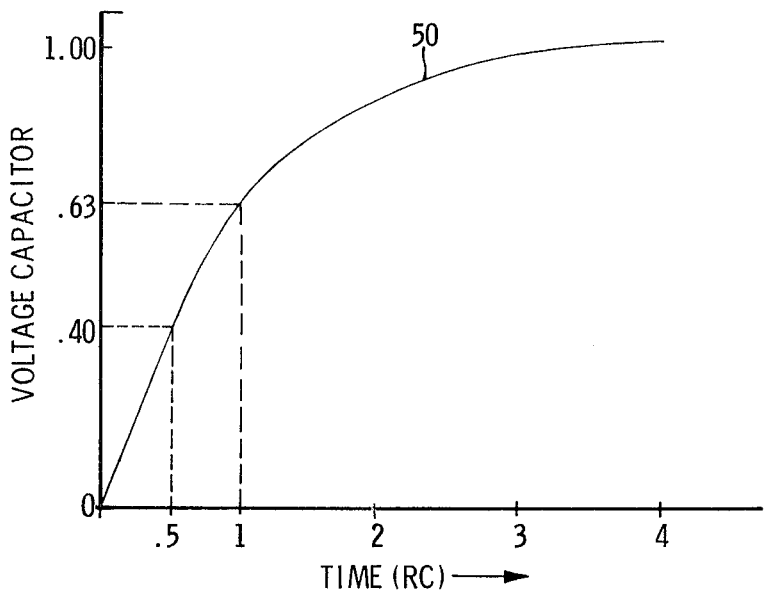
FIG. 2 is a graph which aids in the understanding of the teachings of the invention.

By properly selecting the capacitance and resistance of the charging circuit, a charging RC time constant may be obtained which will have a linear portion over the maximum time delay between signals which will be experienced. For example, FIG. 2 is a universal time constant chart for the charging of a capacitor, with the voltage across the capacitor being plotted against time. The time scale is graduated in terms of the RC time constant. Thus, curve 50 is good for any value of R and C. It will be noted that curve 50 is substantially linear until the voltage on the capacitor reaches about 63 percent of the maximum voltage, which occurs at 1 RC. Thus, if the capacitor must charge to 0.63 of the maximum charging voltage in 100 microseconds, the product of the resistance in ohms times the capacitance in microfarads must equal 100 microseconds. If the slight curvature in curve 50 from about 0.5 RC to 1 RC is objectionable, the portion of the curve from 0 to 0.5 RC may be used, which will charge the capacitor to 40 percent of the charging voltage. Taking the same example, if the capacitor must charge to 40 percent of the maximum charging voltage in 100 microseconds, 0.5 RC equal 100 microseconds, and one complete RC time cycle must therefore be equal to 200 microseconds. By making the charging time constant at least 10 times the maximum time delay between signals to be measured, the error due to nonlinearity is less than 5 percent.

Figure 3:
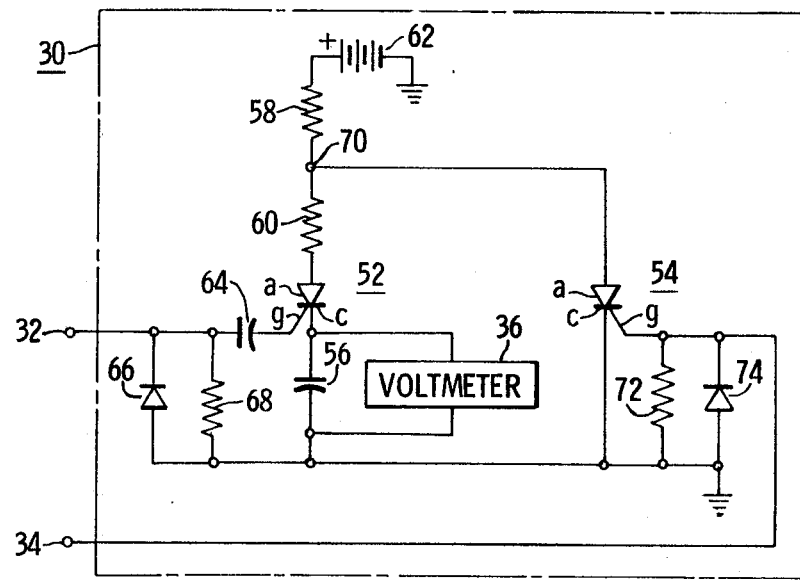
FIG. 3 is a schematic diagram of corona test apparatus constructed according to an embodiment of the invention.

FIG. 3 is a schematic diagram of control means which may be used for control means 30 shown in block form in FIG. 1, with like reference numerals in FIGS. 1 and 3 indicating like components. In this embodiment of the invention input terminal 32 is connected to a first static switching device, such as silicon controlled rectifier or thyristor 52, and input terminal 34 is connected to a second static switching device, such as silicon control rectifier or thyristor 54.

The first signal received should be applied to input terminal 32, which gates controlled rectifier 52 to initiate the charging of a capacitor 56 through resistors 58 and 60. The later received signal is applied to input terminal 34, which gates controlled rectifier 54 to terminate the charging of capacitor 56. The voltage across capacitor 56 is indicated by a high-impedance voltmeter 36. Knowing the speed of the vibrations in the particular fluid or liquid disposed in casing 13, the scale of voltmeter 36 may be calibrated to read distance, which reading will be the difference between the distances separating the transducers from the source of the corona discharge. By moving the transducers after each reading, and then taking another reading, triangulation may be used to pinpoint the location of the corona source. If the voltmeter 36 does not indicate a charge on the capacitor after a test, the transducers may be located equidistant from the source of the corona, or terminal 34 may be receiving a signal before terminal 32. A switch (not shown) may be included to quickly switch the transducers from one input terminal to the other, to direct the first arriving signal to terminal 32, when the first test indicates that the signal may be arriving at the wrong terminal first.

More specifically, controlled rectifier 52 includes anode, cathode and gate electrodes $a$, $c$ and $g$, respectively, with the anode and cathode electrodes being connected between a source 62 of unidirectional electrical potential, such as a battery, and the capacitor 56, with the negative terminal of source 62 being connected to ground, and its positive terminal being connected to the anode electrode of a controlled rectifier 52, through resistors 58 and 60. The cathode electrode $c$ of controlled rectifier 52 is connected to one side of capacitor 56, and the other side of capacitor 56 is connected to ground. Thus, when controlled rectifier 52 is triggered to its conductive state, capacitor 56 will start to charge towards the potential of source 62, with an RC time constant determined by the values of resistors 58 and 60 and the value of capacitor 56. Voltmeter 36 is connected directly across capacitor 56, and it should have a high impedance to prevent it affecting the reading.

Terminal 32 is connected to the gate electrode $g$ of controlled rectifier 52 through means which will prevent false triggering due to transient circuit conditions, such as capacitor 64. Capacitor 64 also prevents capacitor 56 from discharging through the gate of controlled rectifier 52. A diode 66 may be connected between the gate and cathode electrodes of controlled rectifier 52, which is poled to prevent reverse voltage from being applied to the gate electrode $g$. A biasing resistor 68 may also be connected between the gate and cathode electrodes of control rectifier 52, which reduces the gate input sensitivity by requiring the trigger signal to also supply the shunt current through resistor 68.

Controlled rectifier 54 is connected to drop the forward voltage across controlled rectifier 52, when controlled rectifier 54 conducts, to a value which is insufficient to maintain holding current through controlled rectifier 52, which switches controlled rectifier 52 to its nonconductive state and terminates the charging of capacitor 56. Controlled rectifier 54 includes anode, cathode and gate electrodes $a$, $c$ and $g$, respectively, with its anode electrode $a$ being connected to the junction 70 between resistors 58 and 60, and its cathode electrode $c$ being connected to ground, which thus shorts the serially connected controlled rectifier 52 and capacitor 56 when it conducts, dropping the anode voltage of controlled rectifier 52 to approximately ground potential. The gate electrode $g$ of controlled rectifier 54 is connected to terminal 34, with resistor 72 and diode 74 being connected between the gate and cathode electrodes of controlled rectifier 54, in a manner similar to controlled rectifier 52. When the test has been completed, a reset button (not shown) may be connected to remove anode voltage temporarily from controlled rectifier 54, and to discharge capacitor 56, which will prepare the circuit for the next test operation.

Figure 4:
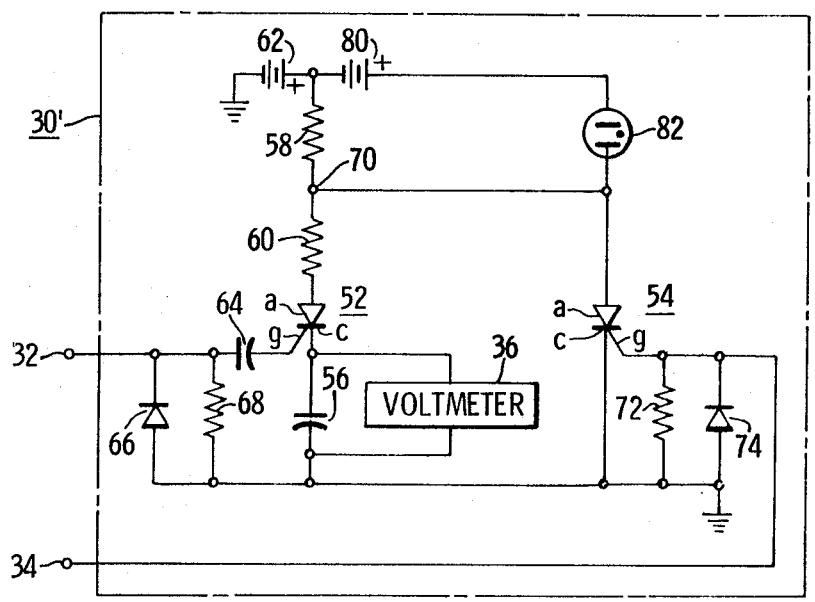
FIG. 4 is a schematic diagram which illustrates a modification of the corona test apparatus shown in FIG. 3.

Indicating means may be added to the control circuit 30, shown in FIG. 3, to provide an indication to the operator when terminal 34 receives a signal prior to a signal being received by terminal 32. When this situation occurs, controlled rectifier 54 becomes conductive, which prevents controlled rectifier 52 from becoming conductive. An embodiment of the invention which provides such indication is shown in FIG. 4, with life reference numerals in FIGS. 3 and 4 indicating like components. The control of FIG. 4 is given the reference numeral 30', to indicate it is a modification of control shown in FIG. 3.

Specifically, control 30' is similar to control 30, except for the addition of a second source 80 of unidirectional potential, such as a battery, and a glow lamp 82, such as a neon bulb. Source 80 has its negative terminal connected to the positive terminal of source 62 and its positive terminal is connected to one side of the glow lamp 82. The other side of glow lamp 82 is connected to the anode electrode of controlled rectifier 54. The glow lamp 82 is selected such that it will conduct an emit light at the combined voltage of sources 62 and 80, but not at the voltage of source 80 plus the voltage drop across resistor 58. If the glow lamp 82 is energized after a test, and the voltmeter 36 does not give a reading, the flow lamp 82 will indicate that corona initiated signals were received by the input terminals, but that the connection of the transducers to the input terminals should be reversed. If, after reversing the connections of the transducers to the input terminals, and the glow lamp is energized after the next test with still no indication on the voltmeter, it will then be an indication that the transducers are equidistant from the source of corona. The glow lamp 82 will also be energized when the transducers are connected to the proper terminals, when controlled rectifier 54 becomes conductive to terminate the charging of capacitor 56, but since voltmeter 36 will have a reading in this situation., the energized glow lamp will be ignored.

Figures 5, 6:
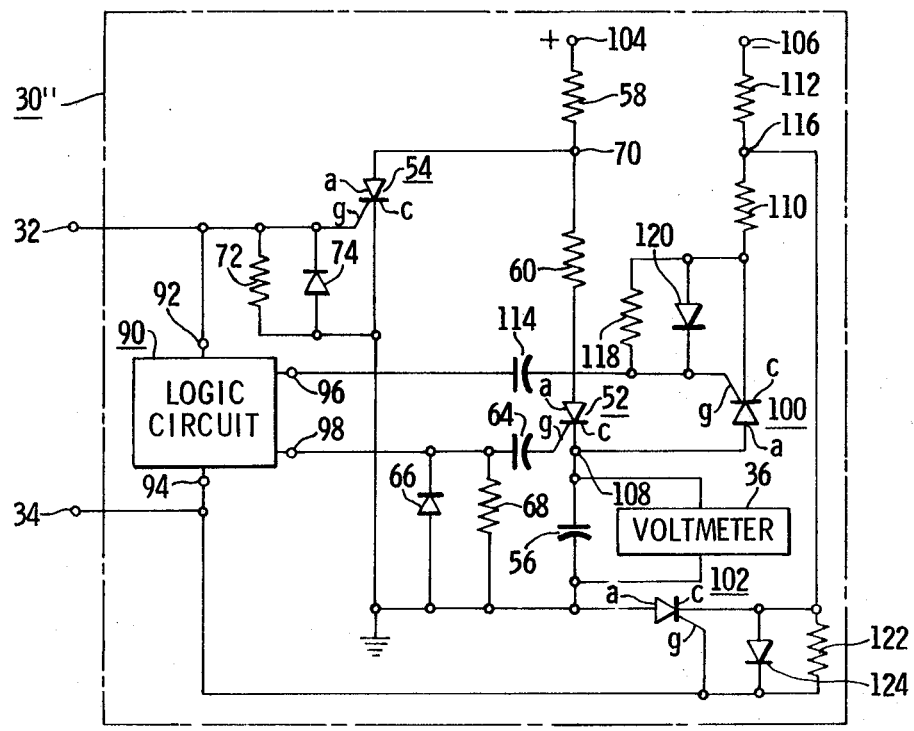
FIG. 5 is a schematic diagram of corona test apparatus constructed according to another embodiment of the invention.
FIG. 6 is a schematic diagram of a logic circuit which may be used in the corona test apparatus shown in FIG. 5.

The control circuit 30 shown in FIG. 3 may be further modified, if desired, to charge capacitor 56 regardless of which input terminal receives the first signal, with the polarity of the charge on the capacitor indicating which transducer is closer to the source of the corona discharge. A control circuit 30" which provides this function is shown in the schematic diagram of FIG. 5, with like reference numerals in FIGS. 3 and 5 indicating like components. The circuit of FIG. 3 is modified, as shown in FIG. 5, to include a logic circuit or means 90 having input terminals 92 and 94, and output terminals 96 and 98, a static switching device 100 such as silicon controlled rectifier, having anode, cathode and gate electrodes a, c and g, respectively, and a static switching device 102, such as a silicon controlled rectifier, having anode, cathode and gate electrodes a, c and g, respectively. Controlled rectifier 52 is connected to a source of positive electrical potential, indicated by terminal 104, and in this instance is connected to be gated by a signal applied to input terminal 34, and controlled rectifier 100 is connected to a source of negative potential, indicated by terminal 106, and is connected to be gated by signals applied to input terminals 32. Since both controlled rectifiers 52 and 100 should not be conductive simultaneously, with only the controlled rectifier being gated which is connected to the input terminal which receives the first signal, the trigger signals for controlled rectifiers 52 and 100 are directed through logic means 90, which allows the first signal to arrive to be directed to the controlled rectifier associated with the input terminal receiving the first signal, but the logic circuit 90 then blocks any later arriving signals.

Controlled rectifier 100 has its anode electrode a connected to the junction 108 between controlled rectifier 52 and capacitor 56, and to negative terminal 106 through resistors 110 and 112. Its gate electrode g is connected to output terminal 96 of logic means 90, through capacitor 114. The gate electrode g of controlled rectifier 52 is connected to output terminal 98 of logic means 90, through diode 64. The input terminals 92 and 94 of logic means 90 are connected to input terminals 32 and 34, respectively.

The gate electrode g of controlled rectifier 54 is connected to input terminal 32, and gate electrode g of controlled rectifier 102 is connected to input terminal 34. The anode and cathode electrodes of controlled rectifier 102 are connected from ground to junction 116 between resistors 110 and 112. Resistor 118 and a diode 120 may be connected across the gate-cathode electrodes of controlled rectifier 100, and resistor 122 and diode 124 may be connected across the gate-cathode electrodes of controlled rectifier 102.

Thus, a signal first applied to input terminal 32 will be directed to input terminal 92 of logic means 90 and through the logic means 90 to output terminal 96, gating controlled rectifier 100. Controlled rectifier 54 will also be gated, but this is of no importance. Controlled rectifier 100 will conduct and charge capacitor 56 until a signal is received by input terminal 34. This later arriving signal is blocked by logic means 90, and is thus only applied to controlled rectifier 102, which conducts and removes the forward voltage across controlled rectifier 100, to terminate the charging of capacitor 56. The magnitude and polarity of the voltage across capacitor 56 is measured by a voltmeter 36, with the polarity indicating terminal 32 received the signal first. A resent button may be connected to discharge capacitor 56 and to interrupt the current flowing through controlled rectifier 102.

If a signal is first applied to input terminal 34, logic means 90 will direct it to output terminal 98, gating controlled rectifier 52. Controlled rectifier 102 will also be gated, but it has no circuit effect. Capacitor 56 will thus start to charge from the positive source of electrical potential, until a signal is received by input terminal 32, which is blocked from reaching controlled rectifier 100 by logic means 90, but which gates controlled rectifier 54 to terminate the charging of capacitor 56. The magnitude and polarity of the charge voltage across capacitor 56 is indicated by voltmeter 36, with polarity indicating that input terminal 34 received the signal first.

FIG. 6 is a schematic diagram of a logic circuit 90' which will provide the functions required of logic means 90 shown in FIG. 5. Logic circuit 90' includes junction transistors 200 and 202, each having base, collector, and emitter electrodes b, c and e, respectively, bias resistors 204, 206, 208 and 210, output resistors 220 and 222, current limiting resistors 228 and 232, sources 230 and 232 of DC potential, such as batteries, and static switching devices 236 and 238, such as silicon controlled rectifiers, each having anode, cathode and gate electrodes a, c and g, respectively.

Resistors 204 and 206 are serially connected between conductors 216 and 212, with conductor 212 being grounded at 214. Terminal 92 is connected to the junction between these resistors, and to the base electrode b of transistor 200. Resistors 208 and 210 are serially connected between conductors 212 and 218, with input terminal 94 being connected to the junction between two resistors, as well as to the base electrode b of transistor 202. The collector electrode c of transistor 200 is connected to conductor 216, and its emitter electrode e is connected to conductor 212 via resistor 220. The collector electrode c of transistor 202 is connected to conductor 218, and its emitter electrode e is connected to conductor 212 via resistor 222. Resistor 228 and battery 230 are serially connected across conductors 216 and 212, with the negative electrode of the battery being connected to conductor 212, and resistor 232 and battery 234 are serially connected across conductors 218 and 212, with the negative electrode of battery 234 being connected to conductor 212. The emitter electrode e of transistor 200 is connected to output terminal 96 via conductor 224, and the emitter electrode e of transistor 202 is connected to output terminal 98 via conductor 226. Controlled rectifier 236 is connected across conductors 216 and 212, with its anode electrode a being connected to conductor 216 and its cathode electrode c being connected to conductor 212. Its gate electrode g is connected to the emitter electrode e of transistor 202. Controlled rectifier 238 is connected across conductors 218 and 212, with its anode electrode a being connected to conductor 218 and its cathode electrode c being connected to conductor 212. Its gate electrode g is connected to the emitter electrode e of transistor 200.

In the operation of the logic circuit 90' shown in FIG. 6, if a signal first appears at input terminal 92, transistor 200 will switch to its conductive state, providing an output signal at output terminal 96, required for the operation of the circuit shown in FIG. 5. The switching of transistor 200 also triggers controlled rectifier 238, which drops the potential on the collector electrode c of transistor 22 to almost ground potential. Transistor 202 is therefore clamped in the off condition, and is unable to respond when a signal arrives at input terminal 94.

If the first signal arrives at input terminal 92, transistor 202 will be switched to its conductive state, providing an output signal at output terminal 98, and also triggering controlled rectifier 236 to clamp transistor 200 in its nonconductive state.

Wen transistors 200 or 202 switch to their nonconductive states, a negative pulse will appear across its associated output resistor, either 220 or 222, but since negative pulses will not switch the controlled rectifiers of the circuit in FIG. 5, the negative pulses are immaterial.

The logic circuit shown in FIG. 6 may be reset in conjunction with the resetting of the corona detection circuit shown in FIG. 5.

To avoid turning on the controlled rectifiers in either the logic circuit or the main corona detection circuit when voltage is first applied to the circuits, a switching arrangement may be used which grounds the gates of the controlled rectifiers while the voltage is being applied. A double-pole, triple-throw, make-before-break-type switch may be used, with the gate electrodes being grounded with no voltage applied in the first switch position, the gate electrodes being grounded with voltage applied in the second switch position, and the gate being connected to the trigger source with voltage applied in the third switch position. This same switch may also be used to discharge the timing capacitor, and when moving the switch from the third position back to the first position, it will automatically reset the circuit.

In summary, there has been disclosed new and improved apparatus for corona testing electrical inductive apparatus, which possesses many advantages. For example, faulty triggering is eliminated. Only corona responsive signals of sufficient energy content to provide gating signals for controlled rectifiers will operate the apparatus. Since only one type of signal is used, i.e., signals from a mechanical to electrical transducer, if the controlled rectifier is fired which initiates the charging of the capacitor, the vibrations from the corona will be sufficient to provide a signal which will terminate the charging. This simplifies the test setup and eliminates the making of capacitor pickups for receiving electrical energy from the transformer bushings, and it thus eliminates any errors which may be due to electrical disturbances in the circuitry external to the transformer. Still further, the measuring of the delays between the arrival of the signals at the transducers is measured without requiring an oscilloscope, which makes the apparatus suitable for portable field use. The capacitors and batteries required are small in size, which makes the apparatus easily portable.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. Apparatus for corona testing electrical inductive apparatus having a casing containing electrical windings disposed in a fluid, comprising:
   first and second mechanical to electrical transducers adapted to be disposed at predetermined spaced locations which are in vibration responsive association with the electrical apparatus,
   energy storage means,
   first and second unidirectional sources of electrical potential, with said first and second sources being positive and negative sources, respectively,
   first, second, third and fourth switching means switchable between conductive and nonconductive states,
   said first and second switching means being connected to charge said energy storage means from said first and second sources of electrical potential, respectively, when said first and second switching means are in their conductive states,
   logic means having first and second input terminals connected to said first and second transducers, respectively, and first and second output terminals associated with the first and second input terminals, respectively, said first and second output terminals being connected to effect the switching of said first and second switching means, respectively, when they provide an output signal,
   said logic means directing the first signal to be applied to one of its input terminals from the transducers, to the output terminal associated with said one input terminal, and blocking a later arriving signal from the other transducer from the other output terminal,
   said third and fourth switching means being connected such that one will terminate the charging of said energy storage means in response to the later arriving signal,
   and means measuring the magnitude of the voltage across said energy storage means, which magnitude is responsive to the difference between the distances separating said first and second transducers from the source of the vibration which initiated the signals, and with the polarity of the voltage indicating which of the transducers is closer to the source of vibrations.

2. The apparatus of claim 1 wherein the third and fourth switching means are connected to switch to their conductive states when a signal is applied to the the first and second input terminals, respectively, of the logic means, with the third switching means being connected across the second switching means and the energy storage means, and the fourth switching means connected across the first switching means and the energy storage means, the switching of the third switching means to its conductive state terminating the charging of the energy storage means when it is charging in response to the second switching means, and the switching of the fourth switching means to its conductive state terminating the charging of the energy storage means when it is charging in response to the first switching means.